United States Patent
Agrawal et al.

(10) Patent No.: US 12,464,184 B1
(45) Date of Patent: Nov. 4, 2025

(54) MEDIA CONTROL INTERFACE FOR A MOBILE DEVICE

(71) Applicant: Motorola Mobility LLC, Chicago, IL (US)

(72) Inventors: Amit Kumar Agrawal, Bangalore (IN); Satyabrata Rout, Bangalore (IN); J Amarnath, Basti (IN); Kushwaha Pankaj, Bengaluru (IN)

(73) Assignee: Motorola Mobility LLC, Chicago, IL (US)

( * ) Notice: Subject to any disclaimer, the term of this patent is extended or adjusted under 35 U.S.C. 154(b) by 280 days.

(21) Appl. No.: 18/107,134

(22) Filed: Feb. 8, 2023

(51) Int. Cl.
*H04N 21/472* (2011.01)
*H04N 21/422* (2011.01)

(52) U.S. Cl.
CPC ... *H04N 21/4222* (2013.01); *H04N 21/47217* (2013.01)

(58) Field of Classification Search
CPC .. G06F 3/04842; G06F 3/0481; G06F 3/0482; G11B 19/025; H04N 21/47217; H04N 21/4222
See application file for complete search history.

(56) References Cited

U.S. PATENT DOCUMENTS

| | | | | |
|---|---|---|---|---|
| 5,195,179 A | * | 3/1993 | Tokunaga | G06F 3/04892 345/163 |
| 5,521,841 A | * | 5/1996 | Arman | H04N 5/147 345/589 |
| 5,760,767 A | * | 6/1998 | Shore | G11B 27/034 |
| 5,852,435 A | * | 12/1998 | Vigneaux | G06F 16/40 345/428 |
| 5,884,056 A | * | 3/1999 | Steele | G06F 16/739 348/E7.071 |

(Continued)

FOREIGN PATENT DOCUMENTS

| CN | 106648025 A | 5/2017 |
|---|---|---|
| CN | 113126862 A | 7/2021 |

(Continued)

OTHER PUBLICATIONS

U.S. Appl. No. 18/107,092, "Final Office Action", U.S. Appl. No. 18/107,092, Aug. 23, 2024, 18 pages.

(Continued)

*Primary Examiner* — Nicholas Augustine
(74) *Attorney, Agent, or Firm* — FIG. 1 Patents

(57) ABSTRACT

Techniques for media control interface for a mobile device are described and are implementable to generate a media control interface for display by a first device to control an application displayed by a second device. For instance, a mobile device executes a media application that supports playback of digital video content, and communicates the digital video content to a display device for display. The mobile device generates a media control interface that is configurable with a variety of selectable indicia based on the digital video content. For instance, the media control interface includes a seekbar to control a temporal location of the digital video content, one or more video control buttons, and a touchpad that maps to actuatable areas of the media application. The media control interface receives an input and controls various functionality of the media application based on the input.

20 Claims, 10 Drawing Sheets

(56) References Cited

U.S. PATENT DOCUMENTS

| | | | | |
|---|---|---|---|---|
| 6,069,606 A * | 5/2000 | Sciammarella | G09G 5/14 | |
| | | | 345/660 | |
| 6,332,147 B1 * | 12/2001 | Moran | G06F 16/489 | |
| | | | 715/231 | |
| 6,463,444 B1 * | 10/2002 | Jain | G06F 16/78 | |
| RE38,401 E * | 1/2004 | Goldberg | G06F 16/54 | |
| | | | 715/802 | |
| RE38,609 E * | 10/2004 | Chen | H04L 67/75 | |
| | | | 715/721 | |
| 6,807,361 B1 * | 10/2004 | Girgensohn | G11B 27/34 | |
| | | | 386/282 | |
| 7,143,362 B2 * | 11/2006 | Dieberger | G06F 16/338 | |
| | | | 715/764 | |
| 7,149,974 B2 * | 12/2006 | Girgensohn | G11B 27/34 | |
| | | | 715/788 | |
| 7,343,026 B2 * | 3/2008 | Niwa | A61B 6/467 | |
| | | | 382/128 | |
| 11,583,760 B1 | 2/2023 | Agrawal et al. | | |
| 12,229,397 B2 | 2/2025 | Agrawal et al. | | |
| 12,321,579 B2 * | 6/2025 | Meirhaeghe | G06F 9/452 | |
| 2003/0184598 A1 * | 10/2003 | Graham | G11B 27/034 | |
| | | | 707/E17.058 | |
| 2003/0189588 A1 * | 10/2003 | Girgensohn | G06F 16/739 | |
| 2005/0162384 A1 * | 7/2005 | Yokoyama | G03B 7/099 | |
| | | | 345/156 | |
| 2006/0090141 A1 * | 4/2006 | Loui | G06F 16/447 | |
| | | | 715/764 | |
| 2006/0103631 A1 * | 5/2006 | Mashima | G06F 1/1694 | |
| | | | 345/158 | |
| 2006/0120624 A1 * | 6/2006 | Jojic | G06F 16/739 | |
| | | | 382/284 | |
| 2006/0252541 A1 * | 11/2006 | Zalewski | A63F 13/42 | |
| | | | 463/36 | |
| 2008/0096654 A1 * | 4/2008 | Mondesir | A63F 13/213 | |
| | | | 463/31 | |
| 2010/0082585 A1 * | 4/2010 | Barsook | G06F 16/9535 | |
| | | | 707/706 | |
| 2013/0067422 A1 | 3/2013 | Hong | | |
| 2013/0217498 A1 | 8/2013 | Wang | | |
| 2013/0249819 A1 | 9/2013 | Akifusa et al. | | |
| 2013/0290846 A1 * | 10/2013 | Calhoun | G06F 16/483 | |
| | | | 715/719 | |
| 2014/0179423 A1 | 6/2014 | Deng et al. | | |
| 2014/0277843 A1 | 9/2014 | Langlois et al. | | |
| 2014/0349757 A1 | 11/2014 | Nogami et al. | | |
| 2016/0283063 A1 | 9/2016 | Missig et al. | | |
| 2017/0258449 A1 | 9/2017 | Nielsen et al. | | |
| 2017/0277498 A1 | 9/2017 | Wood, Jr. et al. | | |
| 2017/0371844 A1 | 12/2017 | Yao | | |
| 2019/0056962 A1 | 2/2019 | Ng et al. | | |
| 2019/0147721 A1 | 5/2019 | Avitan et al. | | |
| 2019/0156788 A1 | 5/2019 | Lee et al. | | |
| 2020/0285438 A1 | 9/2020 | Lagnado et al. | | |
| 2024/0264729 A1 | 8/2024 | Meirhaeghe et al. | | |
| 2024/0264734 A1 | 8/2024 | Agrawal et al. | | |

FOREIGN PATENT DOCUMENTS

| | | |
|---|---|---|
| CN | 113868269 A | 12/2021 |
| CN | 114489398 A | 5/2022 |
| JP | 2013148990 A | 8/2013 |
| JP | 2014021857 A | 2/2014 |
| KR | 20160006337 A | 1/2016 |
| NO | 20181316 A1 | 3/2020 |
| WO | 2017033569 A1 | 3/2017 |

OTHER PUBLICATIONS

Agrawal, Amit Kumar, et al., "US Application as Filed", U.S. Appl. No. 18/107,092, filed Feb. 8, 2023, 52 pages.

Meirhaeghe, Olivier D, et al., "US Application as Filed", U.S. Appl. No. 18/107,171, filed Feb. 8, 2023, 50 pages.

U.S. Appl. No. 18/107,092, "Non-Final Office Action", U.S. Appl. No. 18/107,092, Feb. 28, 2024, 13 pages.

"Corrected Notice of Allowability", U.S. Appl. No. 18/107,092, Jan. 22, 2025, 2 pages.

"Notice of Allowance", U.S. Appl. No. 18/107,092, Dec. 9, 2024, 9 pages.

"Final Office Action", U.S. Appl. No. 18/107,171, Feb. 21, 2025, 43 pages.

"Non-Final Office Action", U.S. Appl. No. 18/107,171, Dec. 12, 2024, 38 pages.

"Notice of Allowance", U.S. Appl. No. 18/107,171, Apr. 11, 2025, 12 pages.

* cited by examiner

MEDIA CONTROL INTERFACE FOR A MOBILE DEVICE

BACKGROUND

Today's person is afforded a tremendous selection of devices that are capable of performing a multitude of tasks. For instance, desktop and laptop computers provide computing power and screen space for productivity and entertainment tasks. Further, smartphones and tablets provide computing power and communication capabilities in highly portable form factors. Many people have access to multiple different devices and use of a particular device depends on the person's current status, such as on the go, in the office, at home, and so forth. While individual instances of devices provide functionality for discrete sets of tasks, the ability for devices to intercommunicate with one another greatly expands available task options and operating environments. For instance, a typical smartphone is able to wirelessly cast visual content to a larger screen device to enable enhanced enjoyment of the content.

In the context of shared media display, however, current techniques for device intercommunication are limited. For instance, dedicated devices such as remote controls are available that provide for input to other devices such as televisions. However, these devices represent additional devices that a user must manage. Some smartphones are able to perform "screen mirroring" to replicate content displayed on the smartphone on an external device. However, conventional screen mirroring involves redundant display of content and thus is computationally expensive, which causes unnecessary "buffering" and low-resolution displays. Thus, conventional techniques for device intercommunication in a media display context are computationally expensive and lead to a diminished user experience.

BRIEF DESCRIPTION OF THE DRAWINGS

Aspects of media control interface for a mobile device are described with reference to the following Figures. The same numbers may be used throughout to reference similar features and components that are shown in the Figures.

DETAILED DESCRIPTION

Figure 1:
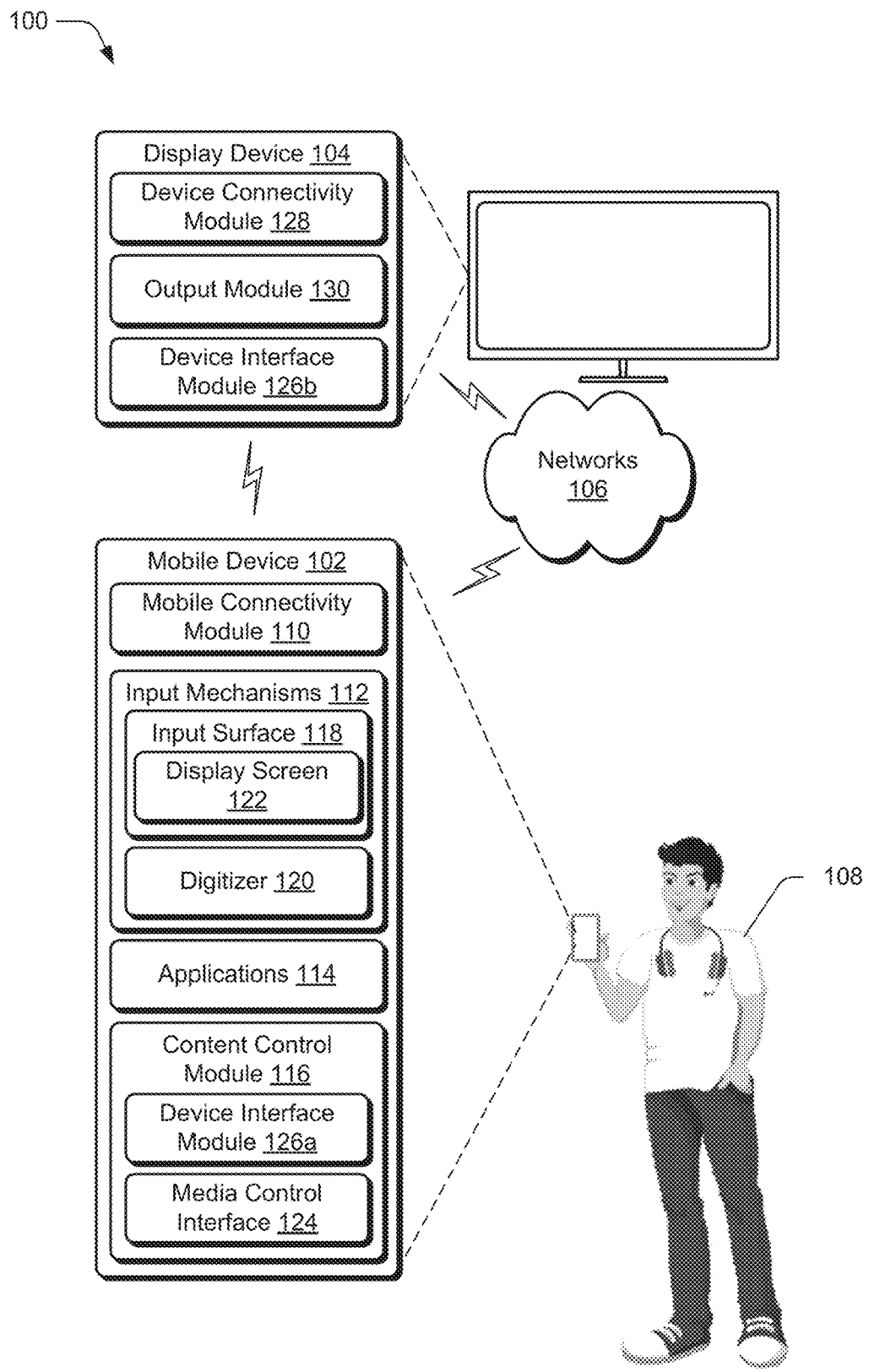
FIG. 1 illustrates an example environment in which aspects of media control interface for a mobile device can be implemented.

Techniques for media control interface for a mobile device are described and are implementable to generate a media control interface for display by a first device, e.g., a mobile device, to control digital content from an application displayed by a second device, e.g., a remote display device. The described implementations, for instance, enable generation of the media control interface to control digital video content from a media application displayed by the remote display device. The media control interface is configurable with a variety of selectable indicia based on the digital video content, such as a seekbar to control a temporal location of the digital video content, one or more video control buttons (e.g., play, pause, forward, rewind, etc.) and/or a touchpad that maps to actuatable areas of the media application. In this way, the media control interface provides intuitive and effective control over a variety of functionality of the media application while conserving computational resources related to redundant display of digital content.

According to various implementations, a first computing device, e.g., a mobile device, is operable to establish a content connectivity session between the mobile device and a second computing device, e.g., a remote display device. Generally, the mobile device establishes connectivity (e.g., wireless and/or wired connectivity) with the remote display device and communicates digital content to the remote display device for output. Accordingly, as part of the content connectivity session, content that is generated, displayed, and/or executed on the mobile device can be displayed on the remote display device, in whole or in part. For example, the mobile device is operable to cause the remote display device to display a graphical user interface of an application that is executed by the mobile device as part of the content connectivity session. In such an example, the mobile device can be leveraged to control functionality of the application, e.g., via input received via a touchscreen of the mobile device.

Consider an example in which the mobile device executes a media application that supports playback of digital video content, such as a content streaming application to play a show, movie, live TV, etc. As part of the content connectivity session, the remote display device displays the digital video content while the mobile device provides functionality to control the media application. Some conventional techniques support "screen mirroring" that replicate content displayed on a smartphone on an external device. However, screen mirroring involves redundant display of content, e.g., displaying the same content on both the smartphone and the external device, which is computationally expensive and can cause unnecessary "buffering" or low-resolution display of digital content. Further, conventional screen mirroring implementations do not generate controls based on features of the digital content and thus encounter limited utility.

Accordingly, the techniques described herein support generation of a media control interface that provides a user with intuitive control over functionality of the media application while conserving computational resources by eliminating redundant content display. In various implementations, the media control interface is configured based on features of the digital video content and/or the media application, and thus overcomes the limitations of conventional techniques. To do so, the mobile device is operable to generate a variety of control features, e.g., selectable indicia, for inclusion in the media control interface.

For instance, the mobile device generates a seekbar that corresponds to the digital video content from the media application. Generally, the seekbar corresponds to a timeline of the digital video content, such that manipulation of a slider included in the seekbar navigates throughout the timeline of the digital video content. For instance, adjusting the slider to the left navigates towards to the start of the timeline, while adjusting the slider to the right navigates towards the end of the timeline, e.g., towards the end of the digital video content. Accordingly, the seekbar is configured such that points along the seekbar map to temporal locations of the digital video content.

In various examples, the seekbar is based on one or more of a length of the digital video content, a display size of the remote display device, and/or a display size of the mobile device. In an example, the mobile device queries an application programming interface ("API") of the media application to determine the length of the digital video content. Alternatively or additionally, the mobile device captures a screenshot of the digital video content displayed by the remote display device to determine the length of the digital video content. For instance, the mobile device extracts visual features from the screenshot that indicate the length, such as a timer and/or a seekbar displayed by the media application. In at least one example, the seekbar is generated based on features of the media application itself, such as visual features and/or design elements. For instance, the seekbar is stylized to match a visual appearance of the media application.

The media control interface is further configurable to include one or more control buttons, such as digital video control buttons to control functionality of the media application (e.g., play, pause, forward, rewind, volume, etc.). Actuation of the video control buttons performs a corresponding action within the media application, e.g., to control the digital video content. The control buttons can be generated by the mobile device based on data extracted from the API of the media application. In an example, the control buttons included in the media control interface are based on features of the media application. For instance, the media application includes a play button, a fast forward button, a rewind button, and a volume control. The mobile device is operable to detect these features and generate corresponding control buttons to include in the media control interface.

Additionally or alternatively, the mobile device can generate control buttons based on features and/or aspects of the digital video content. Consider an example in which the digital video content includes a scene in which multiple languages are being spoken. The mobile device is operable to detect that multiple languages are being spoken and generate a control button to turn on closed captioning. Thus, a user of the mobile device can efficiently select an option to turn on closed captioning without interrupting playback of the digital video content. In this way, the media control interface is particular to the media application as well as configurable based on the digital video content itself.

Further, the media control interface can include a touchpad that maps actuatable regions of the media application to the touchpad. For instance, the touchpad supports functionality to use the media control interface as a "cursor" to navigate the digital video content and/or actuate features of the media application. Accordingly, a user of the mobile device can use a finger and/or stylus to "touch" an area of the media control interface and select a corresponding location in the media application displayed by the remote display device. In another example, the touchpad supports a "scroll" operation, for instance to navigate within the media application. In some examples, other control features such as the seekbar and/or control buttons are overlayed on the touchpad.

Accordingly, using the techniques described herein, the mobile device is operable to conserve computational resources and create an enhanced user experience by generating a media control interface particular to digital video content that is configurable in a variety of ways to support intuitive control over various media applications.

While features and concepts of media control interface for a mobile device can be implemented in any number of environments and/or configurations, aspects of the described techniques are described in the context of the following example systems, devices, and methods. Further, the systems, devices, and methods described herein are interchangeable in various ways to provide for a wide variety of implementations and operational scenarios.

FIG. 1 illustrates an example environment 100 in which aspects of media control interface for a mobile device can be implemented. The environment 100 includes a mobile device 102 and a display device 104 which are interconnectable by a network 106 to enable content from the mobile device 102 to be displayed by the display device 104, for instance as part of a content connectivity session. In this particular example, the mobile device 102 represents a portable device that can be carried by a user 108, such as a smartphone or a tablet device. Further, the display device 104 represents a remote display device such as a laptop computer, external monitor, smart television screen, a desktop computer, augmented reality ("AR) and/or virtual reality ("VR") devices (e.g., AR/VR glasses, projectors, headsets, etc.), and so forth. These examples are not to be construed as limiting, however, and the mobile device 102 and/or the display device 104 can be implemented in a variety of different ways and form factors. Example attributes of the mobile device 102 and the display device 104 are discussed below with reference to the device 800 of FIG. 7.

The mobile device 102 includes various functionality that enables the mobile device 102 to perform different aspects of media control interface for a mobile device discussed herein, including a mobile connectivity module 110, input mechanisms 112, one or more applications 114, and a content control module 116. The mobile connectivity module 110 represents functionality (e.g., logic and hardware) for enabling the mobile device 102 to interconnect with other devices and/or networks, such as the display device 104 and the network 106. The mobile connectivity module 110, for instance, enables wireless and/or wired connectivity of the mobile device 102.

The input mechanisms 112 represent functionality for enabling input to the mobile device 102, such as user input to invoke functionality of the mobile device 102. The input mechanisms 112, for instance, include an input surface 118 and a digitizer 120. Generally, the input surface 118 represents functionality for receiving proximity-based input to the mobile device 102, such as stylus input, user touch input, contactless input based on proximity of a user's finger and/or a stylus to the mobile device 102, and so forth. In various examples, the input surface 118 includes one or more touch sensors. The input surface 118, for example, is implemented via a display screen 122 of the mobile device 102 that is interconnected with the digitizer 120, such as a "touchscreen" of the mobile device 102. For instance, the digitizer 120 receives input to the display screen 122 and converts the input into digital signals that are utilized by the mobile device 102 as input signals.

The one or more applications 114 represent functionality for performing different computing tasks via the mobile device 102, such as gaming (e.g., mobile and/or touch-based gaming), media consumption (e.g., content streaming), productivity tasks (e.g., word processing, content generation, data analysis, etc.), web browsing, communication with other devices, and so forth. The content control module 116 represents functionality for performing various aspects of media control interface for a mobile device described herein. Generally, the content control module 116 is operable to generate a media control interface 124, for instance for display by the display screen 122. As further detailed below, for instance, the media control interface 124 is displayed on the display screen 122 and depicts various selectable indicia to control functionality of the one or more applications 114.

The content control module 116 is further operable to generate digital content to be displayed by the display device 104, such as including digital content from instances of the applications 114. The content control module 116 includes a device interface module 126a that represents functionality for enabling the mobile device 102 to interface with other devices. As further detailed below, the device interface module 126a enables the mobile device 102 to establish wireless and/or wired data communication with other devices, e.g., the display device 104, as part of a content connectivity session.

The display device 104 represents functionality for various types of content output, such as output of visual and audible content. The display device 104 can be implemented in various ways, such as a television (e.g., a smart TV), a display panel, a projector display, a computing device with an associated display device, an external monitor, and so forth. In at least one implementation the display device 104 represents a dedicated display device configured to output visual content generated by other devices, such as content generated at the mobile device 102 and transmitted to the display device 104 for display. Alternatively or additionally, the display device 104 includes computing functionality.

The display device 104 includes various functionality for enabling the display device 104 to output content such as content received from the mobile device 102, including a device interface module 126b, a device connectivity module 128, and an output module 130. The device connectivity module 128 represents functionality (e.g., logic and hardware) for enabling the display device 104 to interconnect with other devices and/or networks, such as the mobile device 102 and the network 106. The device connectivity module 128, for instance, enables wireless and/or wired connectivity of the display device 104 such as for receiving content from other devices for display. In at least one implementation the device connectivity module 128 connects to the network 106 (e.g., via wireless and/or wired connectivity) for intercommunication with other devices and/or networks. Alternatively or additionally the device connectivity module 128 enables direct device-to-device connectivity with other devices, such as the mobile device 102. The mobile connectivity module 110 of the mobile device 102 and the device connectivity module 128 of the display device 104, for instance, are configured to communicate via a variety of different wireless protocols, such as Wireless Local Area Network (WLAN) (e.g., Wi-Fi), Wi-Fi Direct, wireless short distance communication (e.g., Bluetooth™ (including BLE), Near Field Communication (NFC)), and so forth.

The output module 130 represents functionality for enabling content output by the display device 104, such as visual content and audible content. The output module 130, for instance, includes a display driver and/or other logic and hardware to output content by the display device 104. The device interface module 126b is representative of functionality for enabling the display device 104 to interface with other devices. For instance, the device interface module 126b interfaces with the device interface module 126a of the mobile device 102 to enable collaborative data communication between the display device 104 and the mobile device 102. In at least one implementation the device interface module 126b is optional to the display device 104.

Having discussed an example environment in which the disclosed techniques can be performed, consider now some example scenarios and implementation details for implementing the disclosed techniques.

Figure 2:
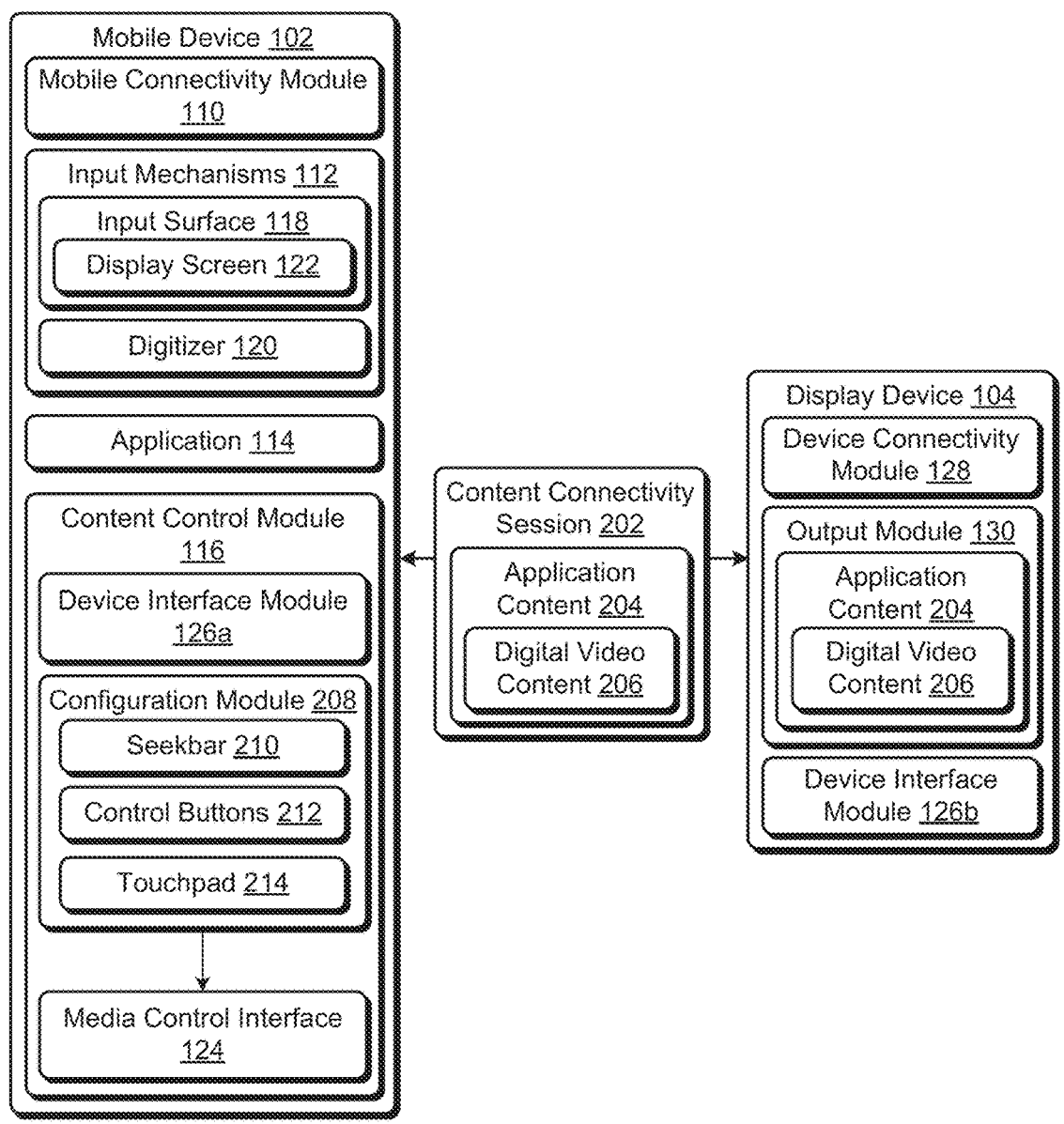
FIG. 2 depicts an example system for media control interface for a mobile device in accordance with one or more implementations.

FIG. 2 depicts an example system 200 for media control interface for a mobile device in accordance with one or more implementations. The system 200 can be implemented in the environment 100 and incorporates attributes of the environment 100 introduced above.

In the example system 200, a content connectivity session 202 is established between the mobile device 102 and the display device 104. The content connectivity session 202, for instance, enables the mobile device 102 to transmit content to the display device 104 for output via wireless and/or wired connectivity. In at least one implementation the content connectivity session 202 is established via negotiation between the mobile connectivity module 110 and the device connectivity module 128. Alternatively or additionally, the content connectivity session 202 is established via communication between the device interface module 126a and the device interface module 126b.

In various examples, the content connectivity session 202 is initiated by a user 108, for instance responsive to a user prompt displayed by the display screen 122. In alternative or additional examples, the content connectivity session 202 is established automatically and without user intervention, such as responsive to an application 114 being launched by the mobile device 102 and/or detection of the display device 104 in proximity to the mobile device 102. In an example, the application 114 is a media application, and initiation of the content connectivity session 202 is responsive to a detection that the application 114 is a media application and supports playback of digital content. This is by way of example and not limitation and the techniques described herein are extensible to a variety of types of applications.

As part of the content connectivity session 202, the mobile device 102 can display digital content from the application 114 via the display screen 122 as well as generate application content 204 to be communicated to the output module 130 for display. The mobile device 102 is operable to edit the application content 204 such that the application content 204 may be effectively displayed by the display device 104, e.g., adjusting an aspect ratio and/or resolution of the application content 204. In an example, the mobile device 102 launches the application 114 and communicates application content 204 to the display device 104 for display. In this example, the display device 104 displays digital content from the application 114 and the mobile device 102 controls functionality of the application 114 as part of the content connectivity session 202. For instance, the application 114 is a media application, and the application content 204 includes digital video content 206, such as videographic, photographic, and/or audial digital content.

The mobile device includes a configuration module 208 that is operable to generate a media control interface 124. The configuration module 208, for instance, is operable to generate various selectable indicia for inclusion in the media control interface 124 as well as configure the media control interface 124 for display by the mobile device 102. In various examples, the configuration module 208 is operable to generate a seekbar 210 that corresponds to the digital video content 206 from the application 114.

Generally, the seekbar 210 corresponds to a timeline of the digital video content 206. In an example, the seekbar 210 includes a slider such that manipulation of the slider causes the mobile device 102 to navigate throughout the timeline of the digital video content 206. For instance, adjusting the slider to the left navigates closer to the start of the timeline, while adjusting the slider to the right navigates closer to the end of the timeline, e.g., towards the end of the digital video content 206. Accordingly, the seekbar 210 is configured such that points along the seekbar 210 map to temporal locations of the digital video content 206.

The configuration module 208 is operable to generate the seekbar 210 in a variety of ways. In one example, the seekbar is based on one or more of a length of the digital video content 206, a display size of the display device 104, and/or a display size of the mobile device 102. For instance, the configuration module 208 is queries an application programming interface ("API") of the application 114 to determine the length of the digital video content 206. Alternatively or additionally, the configuration module 208 captures a screenshot of the digital video content 206 displayed by the remote display device as part of determining the length of the digital video content 206. For instance, the configuration module 208 leverages one or more image recognition techniques to detect one or more visual features of the digital video content 206 that indicate the length such as a time remaining indicator, a time elapsed indicator, a seekbar displayed by the display device 104, etc.

The configuration module 208 is further operable to determine a display size of the display screen 122 of the mobile device 102 and/or a display size of the display device 104, e.g., by querying the mobile device 102 and/or the display device 104 to determine device configuration settings and/or device data that indicate the respective display sizes. In one example, the configuration module 208 calculates a ratio of the length of the digital video content 206 to the display size of the mobile device 102 as part of generation of the seekbar 210. In another example, generation of the seekbar 210 is based in part on a ratio of the length of the digital video content 206 to the display size of the display device 104.

The configuration module 208 can also configure the seekbar 210 to denote one or more temporal boundaries included in the digital video content, such as chapters, breakpoints, sections of the digital video content 206, etc. The configuration module 208, for instance, can determine the temporal boundaries based on a screenshot of the digital video content 206. For instance, the configuration module 208 can extrapolate the temporal boundaries from a seekbar displayed by the application 114 using one or more object recognition strategies. Alternatively or additionally, the configuration module 208 can determine the temporal boundaries by querying an API of the application 114.

In at least one example, the configuration module 208 configures the seekbar 210 for precision navigation. For instance, the configuration module 208 is operable to adjust the rate at which manipulation (e.g., "sliding") of the seekbar 210 navigates throughout the timeline of the digital video content 206. In one example, the configuration module 208 configures the seekbar 210 such that manipulation of a slider of the seekbar 210 results in "coarse" adjustment to the timeline, e.g., large changes to the temporal location. In a precision navigation example, the configuration module 208 configures the seekbar 210 such that manipulation of a slider of the seekbar 210 results in "fine" adjustment to the timeline, e.g., minute changes to the temporal location. Accordingly, coarse adjustment enables a user to navigate to a general temporal region of the digital video content 206, while precision navigation enables fine control to navigate to an exact temporal location of the digital video content 206.

In some examples, the configuration module 208 configures the seekbar 210 for precision navigation responsive to an input to initiate precision navigation. For instance, the input is a user input to touch a slider of the seekbar 210 over a threshold amount of time. This is by way of example and not limitation, and a variety of inputs and/or controls are contemplated to initiate precision navigation. Additionally or alternatively, the configuration module 208 configures the seekbar 210 for precision navigation based on features of the digital video content 206, such as visual and/or audial features including rapid and/or slow audio content, brightness, frame rate, contrast, movement quantifications, scene features, etc. In one example, for instance, the configuration module 208 determines that the digital video content 206 includes an "action scene" and provides for precision navigation for the action scene automatically such that a user can efficiently navigate to particular temporal moments of the digital video content 206.

In some implementations, the configuration module 208 configures the seekbar 210 such that manipulation of the seekbar 210 provides a preview of digital content, e.g., digital content that corresponds to a temporal location determined by the seekbar 210. For instance, the configuration module 208 generates a preview image to display in the media control interface 124 along with the seekbar 210 that depicts the digital video content 206 at a temporal location that maps to a location of the slider of the seekbar 210. In some examples, the configuration module 208 further generates a plurality of preview images to display in a chronological order along with the seekbar 210 in the media control interface 124. In this way, a user is provided with a preview, e.g., one or more images and/or video content, that corresponds to temporal locations of the digital video content 206 and facilitates intuitive and efficient navigation within the digital video content 206.

Additionally, as further described below with respect to FIG. 5, in various implementations the seekbar is generated based on one or more visual features of the media application and/or the digital video content 206. For instance, the configuration module 208 is operable determine a visual style of the application 114 and/or the digital video content 206, such as by using one or more image recognition techniques and/or machine learning models. Based on the determined visual style, the configuration module 208 can apply visual effects to the seekbar 210 to match the visual style of the media application. In this way, the seekbar 210 is configurable to be specific to a particular application and/or digital video content 206.

The configuration module 208 is further operable to generate one or more control buttons 212, e.g., one or more video control buttons, for inclusion in the media control interface 124. Generally, actuation of the control buttons 212 performs a corresponding action within the application 114, such as to control functionality of the application 114, the display device 104, and/or adjust features of the digital video content 206. For instance, the control buttons 212 can include buttons and/or any suitable selectable indicia (e.g., sliders, knobs, icons, etc.) to control the digital video content 206, such as to play, pause, rewind, fast forward, skip forward, skip backwards, etc. The control buttons 212 can also include selectable indicia to control functionality of the application 114 and/or the display device 104, such as to control volume, add/remove closed captions, adjust display settings (e.g., brightness, resolution, contrast, color, tint, video quality, picture mode, etc.), share the digital video content 206, close the application 114, etc. For instance, the control buttons 212 include one or more vertical and/or horizontal sliders to control volume, brightness, etc.

In an example, the configuration module 208 generates the control buttons 212 based on data extracted from the API of the application 114. The configuration module 208 is operable to query the API to determine controls included in the application 114. In an additional or alternative example, the configuration module 208 captures a screenshot to determine and/or validate the controls included in the application 114. The configuration module 208 is operable to generate control buttons 212 that correspond to the controls of the application 114. By way of example, the application 114 is a media control application and includes a play button, a fast forward button, a rewind button, and a volume control. The configuration module 208 is operable to detect these controls and generate corresponding control buttons 212 that control the same and/or similar functionality. Further, the configuration module 208 is operable to generate the control buttons 212 to have a same or similar visual style and/or appearance as the application 114, such as described above with respect to generation of the seekbar 210.

Additionally or alternatively, the configuration module 208 can generate control buttons 212 based on features and/or aspects of the digital video content 206. For instance, the configuration module 208 is operable to detect audial features of the digital video content 206, such as detection of slurred words, garbled audio, multiple languages, increased/decreased volume, etc. Based on the audial features, the configuration module 208 generates a control button 212 for inclusion in the media control interface 124, such as a control button 212 to turn on closed captioning, adjust the volume, etc. Consider an example in which the digital video content 206 includes an "action" scene that increases in volume from a previous scene. The configuration module 208 detects the change in audial properties (the increase in volume) and consequently generates a control button 212 for volume adjustment to include in the media control interface 124.

In another example, the configuration module 208 detects one or more visual properties of the digital video content 206, such as brightness, frame rate, contrast, movement quantifications, scene features, etc. Based on the visual properties, the configuration module 208 generates a control button 212 for inclusion in the media control interface 124. By way of example, the configuration module 208 detects that a scene included in the digital video content 206 has low brightness. Responsive to the detection, the configuration module 208 generates a control button 212 to adjust picture settings of the digital video content 206, e.g., to turn up the brightness, without interrupting playback of the digital video content 206.

In another example, the configuration module 208 determines properties of an upcoming scene included in the digital video content 206. For example, the configuration module 208 determines (such as through a query to the application API) that an upcoming scene depicts age-restricted content, includes fast flashing lights, depicts sensitive subject matter, includes vulgar or crass language, etc. Based on such a determination, the configuration module 208 generates a control button 212 to skip the upcoming scene. In various examples, this is based in part on user data of a user 108 of the mobile device 102, e.g., age data, identity data, demographic data, etc. The configuration module 208 may also generate a graphic to display as part of the media control interface 124 along with the control buttons 212, such as a text-based notice that indicates the upcoming scene includes flashing lights and may not be suitable for people with photosensitive epilepsy. Accordingly, in this example actuation of the control button to skip the upcoming scene causes an automatic adjustment to the seekbar 210, e.g., to adjust a temporal location of the digital video content 206 beyond the scene.

In at least one example, the configuration module 208 dynamically updates the control buttons 212 included in the media control interface 124 during playback of the digital video content 206, such as based on varying characteristics of the digital video content 206. For instance, the configuration module 208 adds and/or removes control buttons 212 from the media control interface 124 throughout the content connectivity session 202. Accordingly, the techniques described herein support dynamic and intuitive control over the digital video content 206.

The configuration module 208 is further operable to generate a touchpad 214 that maps actuatable regions of the application 114 to the touchpad 214. For instance, the configuration module 208 supports functionality to use the touchpad 214 as a "cursor" and/or "pointer" to navigate the digital video content 206 and/or actuate features of the application 114. Accordingly, a user of the mobile device can use a finger and/or stylus to "touch" an area of the touchpad 214 and actuate a corresponding location in the application 114 displayed by the display device 104. In some implementations, actuation of the touchpad 214 causes the application 114 to "bring up" various control features and/or icons, such that the control features are displayed by the display device 104.

In an example, a user 108 of the mobile device 102 is a teacher displaying a video to a class of students. The teacher is able to pause the digital video content 206, e.g., using the one or more control buttons 212, and leverage functionality of the touchpad 214 to identify features depicted by the digital video content 206 as a teaching aid. In another example, the touchpad supports a "scroll" operation, for instance to navigate within various screens of the application 114. For instance, the application 114 is a streaming application and a user 108 of the mobile device 102 is able to use the touchpad 214 to select the digital video content 206 for display, such as a particular movie from a selection of available films.

Accordingly, the configuration module 208 can generate the media control interface 124 to include one or more of the seekbar 210, the control buttons 212, and/or the touchpad 214. In at least one implementation, the configuration module 208 generates the media control interface 124 automatically and without user intervention responsive to detecting playback of the digital video content 206 within the application 114. The media control interface 124 is configurable in a variety of ways. The media control interface 124 is configurable in a landscape and/or a portrait orientation, and the configuration module 208 supports seamless transition between portrait and/or landscape orientations. In one example, the seekbar 210 and/or control buttons 212 are overlayed on the touchpad 214. In another example, the media control interface 124 includes an option to dismiss one or more of the seekbar 210, control buttons 212, and/or the touchpad 214. For instance, the media control interface 124 is user configurable and one or more of the seekbar 210, control buttons 212, and/or the touchpad 214 can be added or removed from the media control interface 124 based on user input.

Once generated, the mobile device 102 displays the media control interface 124 in a user interface, such as via the display screen 122. In at least one example, the mobile device 102 displays the media control interface 124 throughout playback of the digital video content 206 as part of the content connectivity session 202. The mobile device 102 is operable to receive an input to the media control interface 124, such as one or more instances of proximity-based input, e.g., stylus input, user touch input, interaction with a touchscreen and/or input surface 118 of the mobile device 102, a contactless input based on proximity of a user's finger and/or a stylus to the mobile device 102, and so forth. Responsive to receipt of the input, the mobile device 102 is operable to control various features and/or functionality of the application 114 and/or the digital video content 206.

For example, the mobile device 102 receives an input to the media control interface 124 to adjust a position of a slider of the seekbar 210. Based on the input, the mobile device 102 adjusts a temporal location of the digital video content 206 displayed by the display device 104, such as to adjust a scene displayed by the digital video content 206. In an example, the mobile device 102 calculates a ratio of movement of the slider relative to the length of the digital video content 206. The mobile device 102 communicates the ratio to an API of the application 114 and based on the ratio the temporal location of the digital video content 206 is adjusted a corresponding amount.

Additionally or alternatively, the input to the media control interface 124 is to actuate one or more of the control buttons 212. Actuation of the control buttons 212 performs a corresponding action within the application 114 to adjust the digital video content 206, such as via communication with the API of the application 114. In another example, the input is to actuate a region or regions of the touchpad 214. The mobile device 102 adjusts and/or augments the digital video content 206 based on the actuation of the touchpad 214, such as to move a digital cursor, perform a scroll operation, and/or leverage additional features of the application 114. In an example, the mobile device 102 is operable to determine that playback of the digital video content 206 has stopped and automatically terminate display of the media control interface 124 responsive to detection that playback has stopped.

Accordingly, using the techniques described herein, the mobile device 102 is operable to conserve computational resources and create an enhanced user experience by generating a media control interface 124 particular to the digital video content 206 that is configurable in a variety of ways to support intuitive control over various applications 114.

Figure 3A:
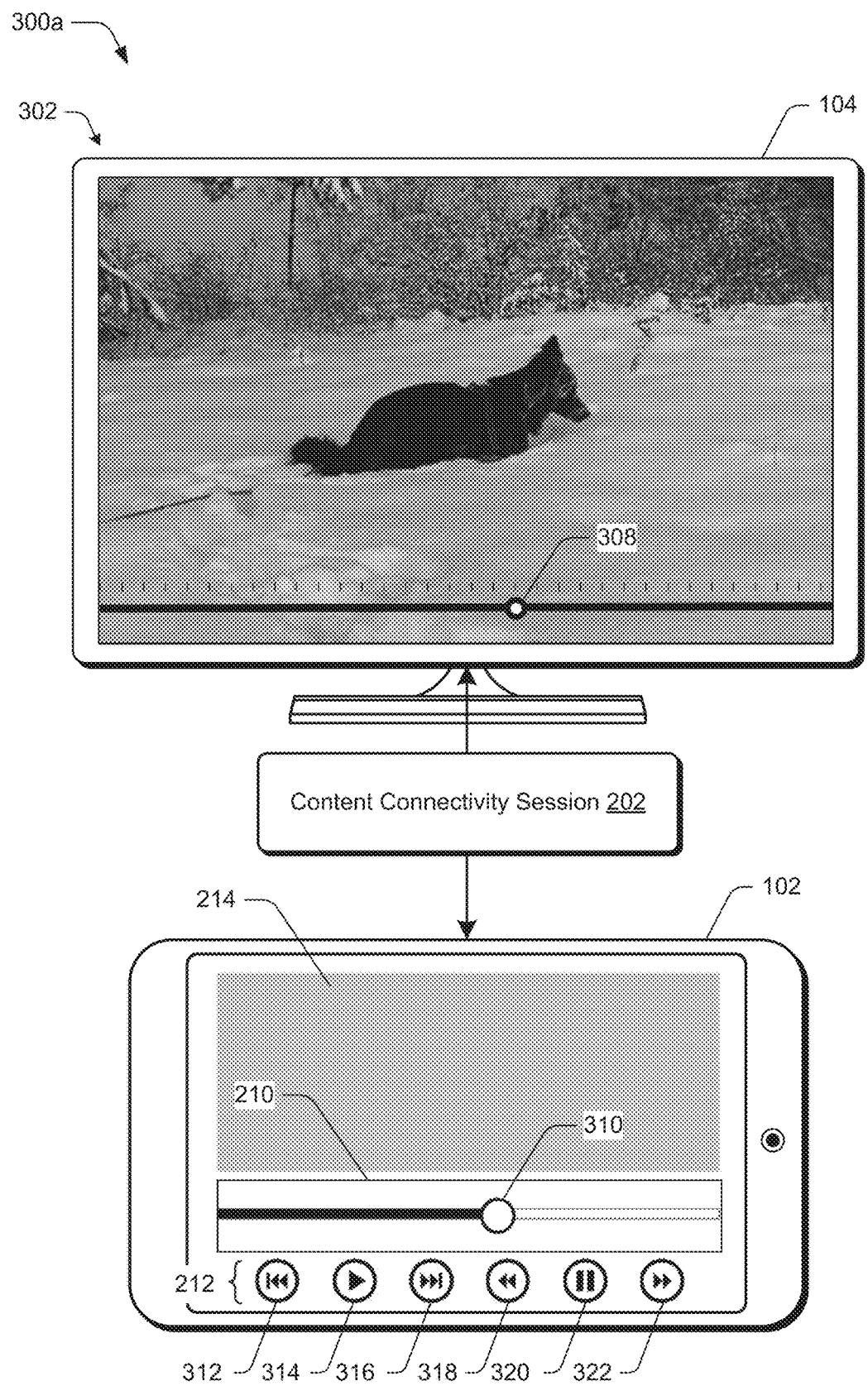
FIGS. 3a, 3b, and 3c depict an example implementation for media control interface for a mobile device in accordance with one or more implementations.
Figure 3B:
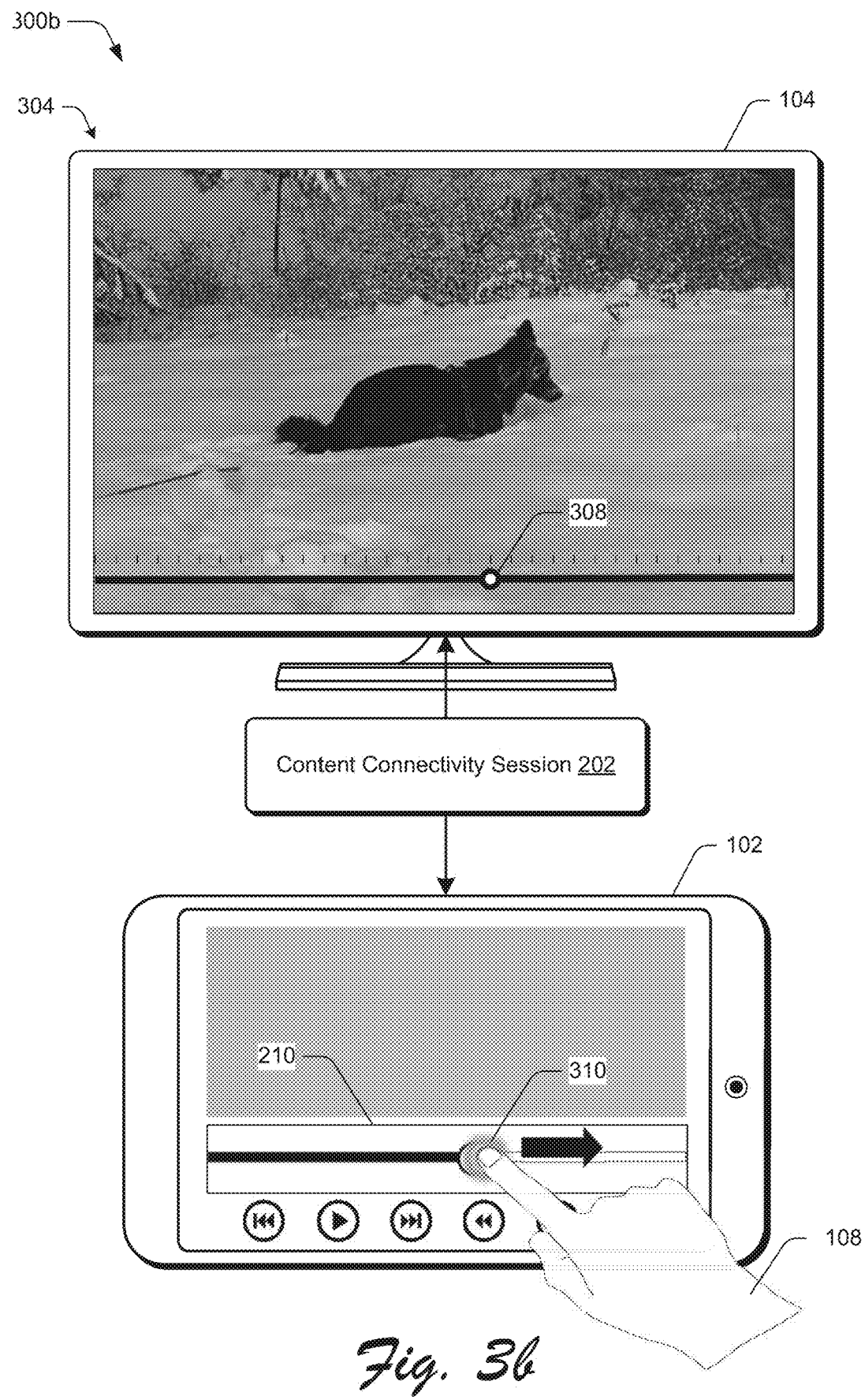
Figure 3C:
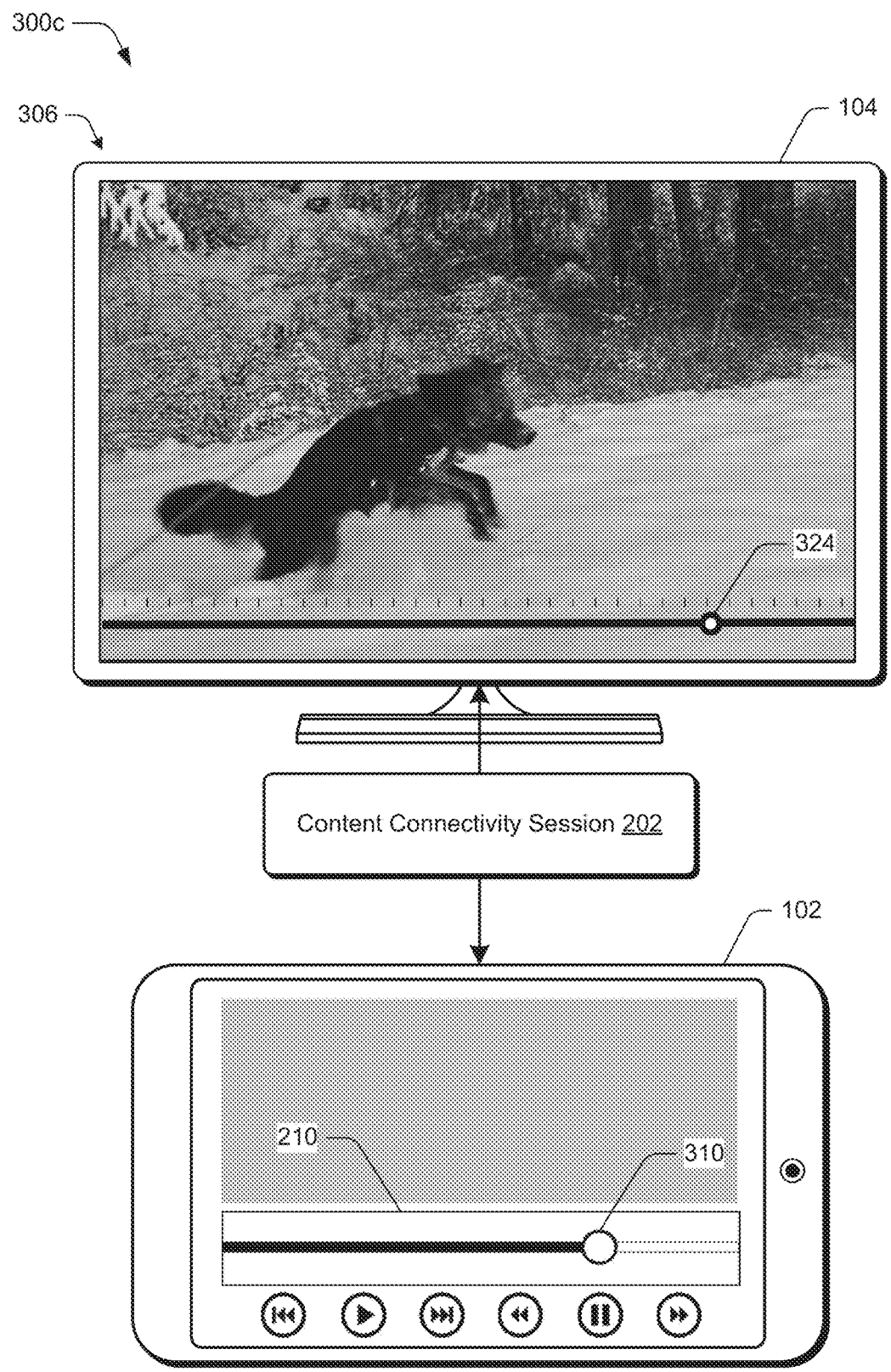

FIGS. 3a, 3b, and 3c depict an example implementation 300a, 300b, and 300c for media control interface for a mobile device in accordance with one or more implementations. In this example, shown in first stage 302, second stage 304, and third stage 306, the mobile device 102 is operable to generate a media control interface 124 to control functionality of an application 114, which in this example is a media application including digital video content 206 depicting a video of a dog playing in snow. As shown in first stage 302, a mobile device 102 establishes a content connectivity session 202 between the mobile device 102 and a display device 104. As part of the content connectivity session 202, the mobile device 102 executes the media application and causes the display device 104 to display application content 204 from the media application. In this example, a first temporal location of the digital video content 206 is represented at 308, e.g., just over midway through the video.

In accordance with the techniques described herein, the mobile device 102 generates a media control interface 124 to control functionality of the media application. As shown in first stage 302, for instance, the media control interface 124 is displayed by the mobile device 102 and includes a seekbar 210 with a slider 310, a touchpad 214, and several control buttons 212, for instance a skip backward button 312, a play button 314, a skip forward button 316, a rewind button 318, a pause button 320, and a fast forward button 322. While depicted in this example in a "landscape" orientation, it should be understood that the mobile device 102 may also configure the media control interface 124 in a portrait orientation, such as based on an orientation of the mobile device 102.

The seekbar 210 is configured to control a temporal location of the digital video content 206, e.g., via manipulation of the slider 310. Actuation of the control buttons 212 performs a corresponding action within the application 114, e.g., actuation of the pause button 320 causes the media application to pause playback of the digital video content 206. The touchpad 214 maps actuatable regions of the media application, for instance to support user control of a "digital cursor."

As depicted in second stage 304, the mobile device 102 receives an input to adjust the slider 310 of the seekbar 210. For instance, the input is a user input to drag the slider 310 to the right. In this example, a user 108 desires to "advance" the digital video content 206. Accordingly, as shown in third stage 306, the user input to adjust the slider 310 is effective to adjust a temporal location of the digital video content 206, for instance to advance the video to a second temporal location as represented at 324. Accordingly, the video of the dog is advanced by a corresponding amount. In this way, the techniques described herein provide effective and intuitive control of the media application while conserving computational resources.

Figure 4:
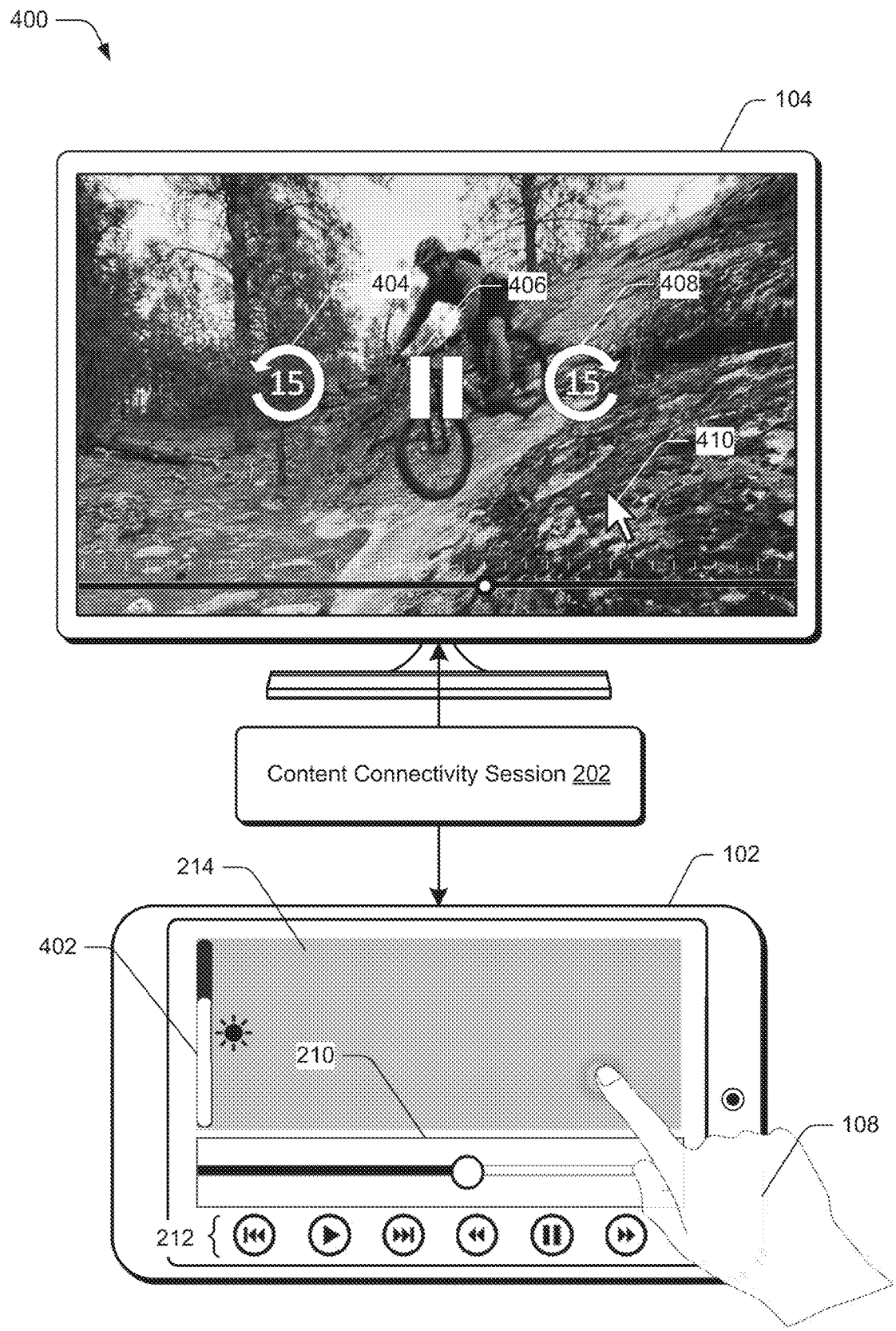
FIG. 4 depicts an example implementation for media control interface for a mobile device including functionality of a touchpad of the media control interface in accordance with one or more implementations.

FIG. 4 depicts an example implementation 400 for media control interface for a mobile device including functionality of a touchpad of the media control interface. In this example, a mobile device 102 establishes a content connectivity session 202 between the mobile device 102 and a display device 104. As part of the content connectivity session 202, the mobile device 102 executes an application, which in this instance is a media application that supports playback of digital video content 206 including a video of a person mountain biking. In accordance with the techniques described herein, the mobile device 102 is operable to generate and display the media control interface 124, which in this example includes a seekbar 210, several control buttons 212, and a touchpad 214. The media control interface 124 further includes a brightness slider 402, such that actuation of the slider adjusts a brightness of the media application and/or the display device 104.

In this example, actuation of the touchpad 214 causes the media application to "bring up" control features on the display device 104, such as a first control 404 to skip backwards fifteen seconds, a second control 406 to pause the video, and a third control 408 to skip forwards fifteen seconds. Further, through actuation of the touchpad 214, a user 108 is able to control a cursor 410 displayed by the display device 104. In this way, the user 108 is able to select one or more of the control features, such as the first control 404, the second control 406, and/or the third control 408.

Figure 5:
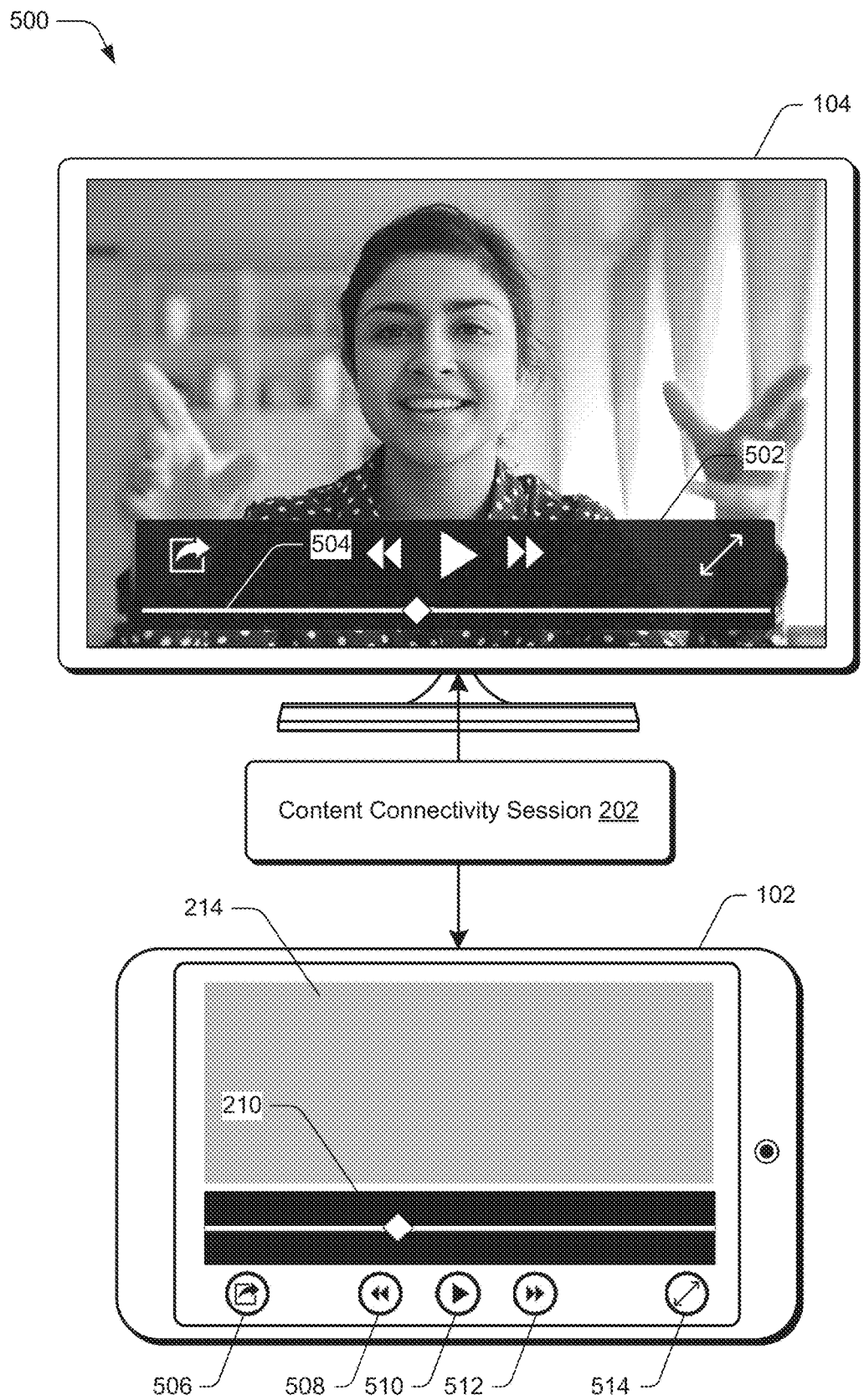
FIG. 5 depicts an example implementation for media control interface for a mobile device in which the media control interface is based on features of a media application in accordance with one or more implementations.

FIG. 5 depicts an example implementation 500 for media control interface for a mobile device in which the media control interface is based on features of a media application. In this example, a mobile device 102 establishes a content connectivity session 202 between the mobile device 102 and a display device 104. As part of the content connectivity session 202, the mobile device 102 executes an application 114, which in this instance is a media application that supports playback of digital video content 206 including a video of a woman speaking. The media application includes inherent controls, such as the control graphic 502.

In this example, the mobile device 102 generates a seekbar 210 based on visual properties of the media application. For instance, the mobile device 102 is operable to detect a visual "style" of the media application, such as by using one or more image recognition techniques and/or machine learning models. In this example, the mobile device 102 detects that a seekbar of the media application, shown at 504, includes a white bar with a white diamond shaped slider. Accordingly, the mobile device 102 is operable to generate a seekbar 210 with the same or similar visual properties as the seekbar shown at 504. For instance, the seekbar 210 includes a white bar with a white diamond shaped slider.

Further, in this example the mobile device 102 generates the control buttons 212 based on the media application. For instance, the mobile device 102 determines that the application supports functionality to share, rewind, play, fast forward, and enlarge the digital video content 206. Accordingly, the mobile device 102 generates control buttons 212 such as a share button 506, a rewind button 508, a play button 510, a fast forward button 512, and an enlarge button 514. In this way, the mobile device 102 can generate a media control interface 124 that is particular to the media application by supporting similar functionality and matching a visual style as the media application, which provides an intuitive user experience.

Figure 6:
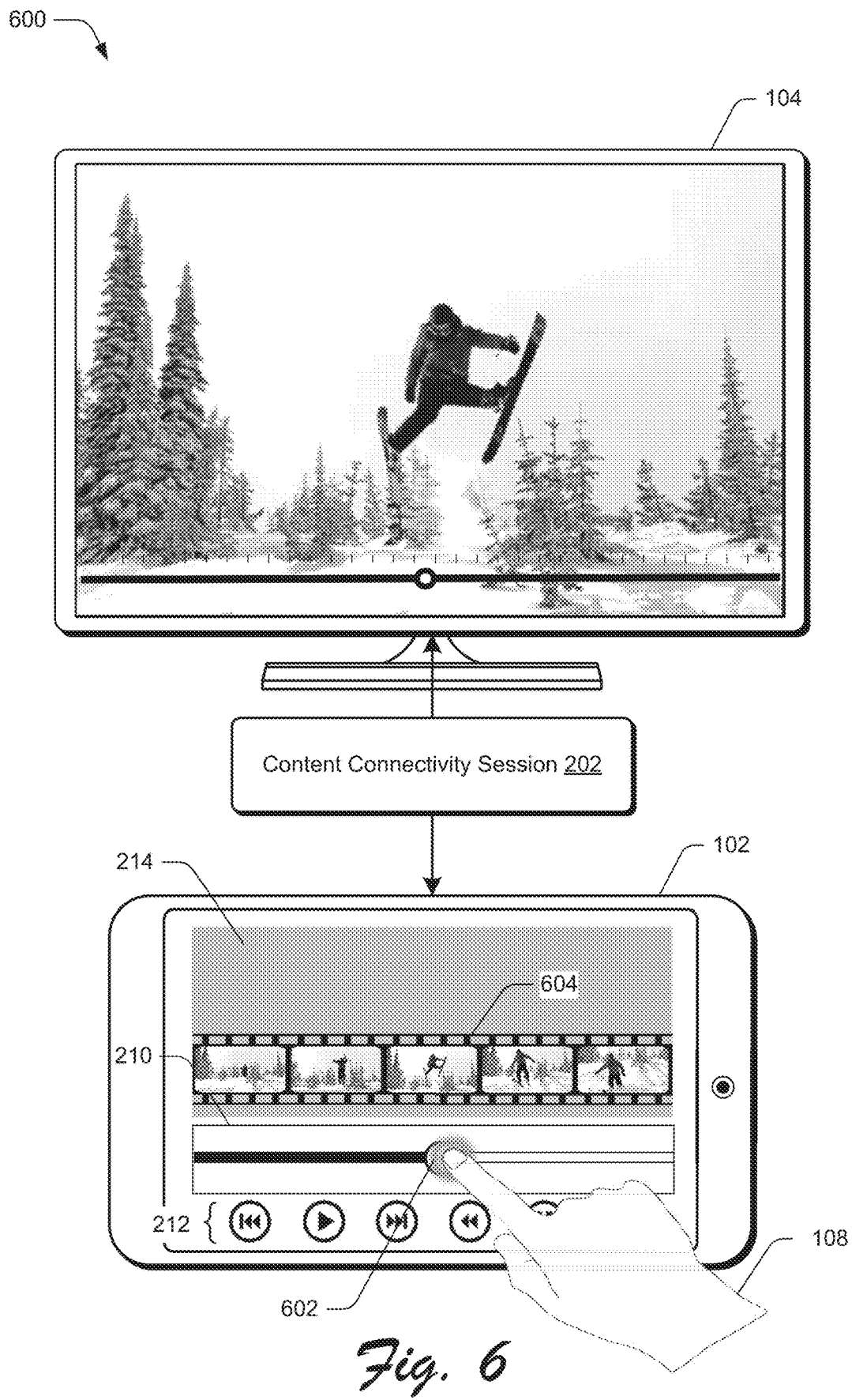
FIG. 6 depicts an example implementation for media control interface for a mobile device including a seekbar configured for precision navigation.

FIG. 6 depicts an example implementation 600 for media control interface for a mobile device including a seekbar configured for precision navigation. In this example, a mobile device 102 establishes a content connectivity session 202 between the mobile device 102 and a display device 104. As part of the content connectivity session 202, the mobile device 102 executes an application 114, which in this instance is a media application that supports playback of digital video content 206 including a video of a person downhill skiing. In accordance with the techniques described herein, the mobile device 102 is operable to generate and display the media control interface 124, which in this example includes a seekbar 210 with a slider 602, several control buttons 212, and a touchpad 214.

In this example, the mobile device 102 configures the seekbar 210 for precision navigation. For instance, the mobile device 102 is operable to detect a proximity-based input, e.g., a touch by user 108, to hold the slider over a threshold period of time to initiate precision navigation. Further, the mobile device 102 detects that the video includes an "action scene" e.g., the skier going off of a jump, based on metadata associated with the video and detected scene features. Accordingly, the mobile device 102 configures the seekbar 210 such that that manipulation of the slider 602 results in fine adjustment of a temporal location of the video. As part of the precision navigation, the mobile device 102 further generates a preview 604 of digital content, e.g., video scenes, that correspond to points along a timeline of the video based on the position of the slider 602. In this way, the techniques described herein facilitate intuitive and efficient navigation within the digital video content 206.

Figure 7:
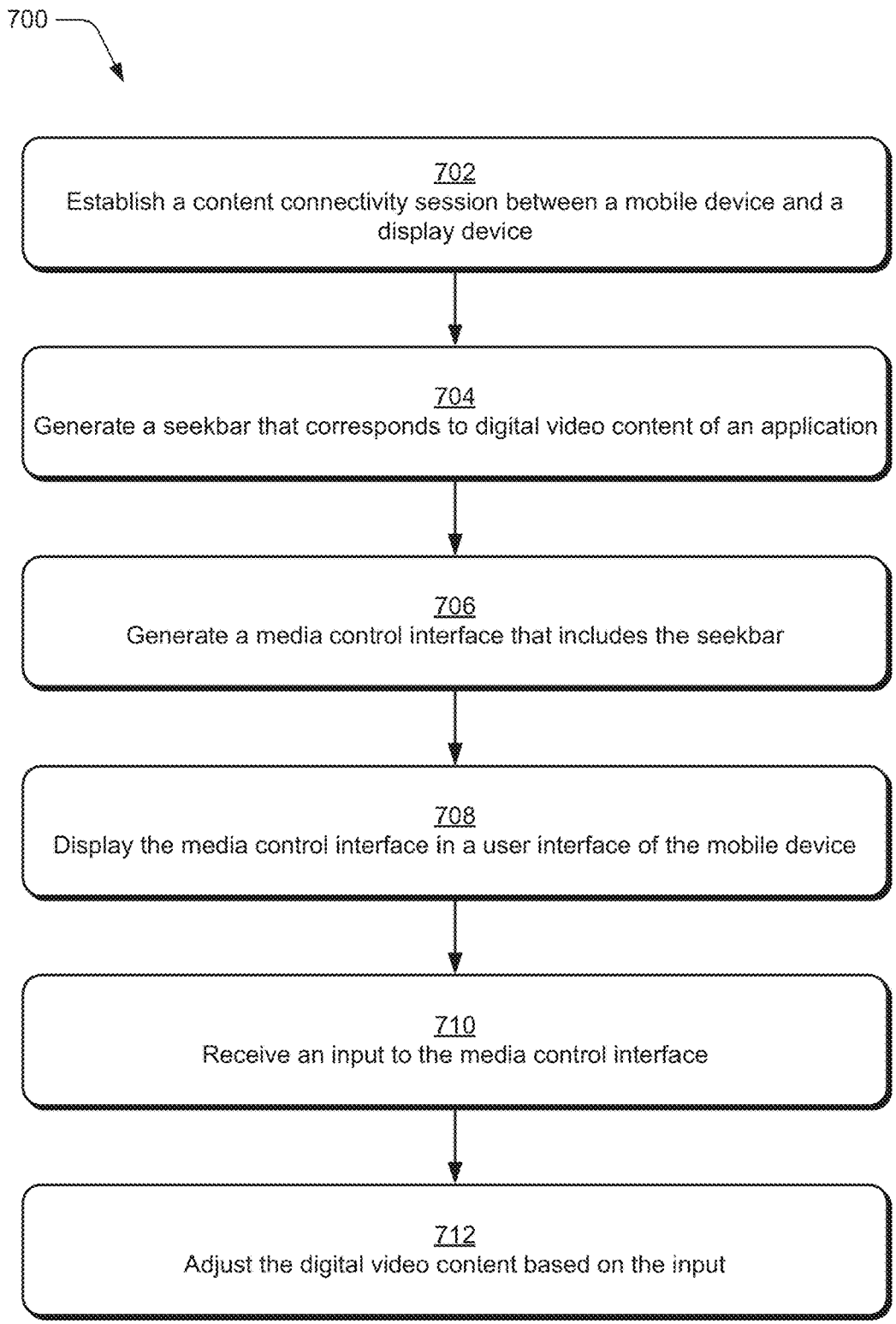
FIG. 7 illustrates a flow chart depicting an example method for media control interface for a mobile device in accordance with one or more implementations.

FIG. 7 illustrates a flow chart depicting an example method 700 for media control interface for a mobile device in accordance with one or more implementations. At 702, a content connectivity session is established between a mobile device and a display device. The content connectivity session 202, for instance, enables the mobile device 102 to transmit digital content to the display device 104 for output via wireless and/or wired connectivity. In an example, the content connectivity session 202 is executed automatically responsive to launch of an application 114, such as a media application that supports playback of digital video content 206, by the mobile device 102. As part of the content connectivity session 202, the mobile device 102 communicates digital content from the application 114 for display by the display device 104 and controls functionality of the application 114.

At 704, a seekbar is generated that corresponds to digital video content of an application. In this example, the application 114 is a media application that supports playback of digital video content 206, and the seekbar corresponds to a timeline of the digital content. The seekbar 210, for instance, is based on a length of the digital video content 206, a display size of the mobile device 102, and/or a display size of the display device 104. For instance, the seekbar 210 is generated based on a ratio of the length of the digital video content 206 to the display size of the mobile device 102. In an example, generation of the seekbar 210 includes capturing a screenshot of the digital video content 206 displayed by the display device 104. The screenshot, for instance, is usable by the mobile device to determine the length of the digital video content 206.

In an example, the seekbar 210 is configured by the mobile device 102 to include one or more indicators that denote one or more temporal boundaries included in the digital video content. For instance, the seekbar 210 includes visual markers to indicate temporal boundaries such as chapters, sections, scenes, segments, etc. in the digital video content 206. In various implementations, the mobile device 102 generates the seekbar based on a visual style of the application 114. For instance, the mobile device 102 stylizes the seekbar 210 to emulate a style of the media application.

At 706, a media control interface is generated that includes the seekbar. In various examples, the media control interface 124 is particular to the digital video content 206, and includes the seekbar 210, one or more control buttons 212, and/or a touchpad 214. The seekbar 210 is included in the media control interface 124 to control a temporal location of the digital video content 206. Generally, actuation of one or more of the control buttons 212 performs a corresponding action within the application 114, such as to control functionality of the application 114, the display device 104, and/or adjust features of the digital video content 206. In an example, the one or more control buttons 212 are generated for the media control interface 124 based on data extracted from an application programming interface of the application 114.

In various examples, the media control interface 124 includes a touchpad 214 that maps actuatable regions of the application 114 to the touchpad 214. For instance, the touchpad 214 is usable to control a digital "cursor" and/or "pointer" to navigate the digital video content 206 and/or actuate features of the application 114. In one example, the mobile device 102 overlays the seekbar 210 and the control buttons 212 on the touchpad 214 to generate the media control interface 124.

At 708, the media control interface is displayed in a user interface of the mobile device 102. In at least one example, the mobile device 102 displays the media control interface 124 throughout playback of the digital video content 206 as part of the content connectivity session 202, for instance to control the application 114. Further, the mobile device 102 is operable to determine that playback of the digital video content 206 has stopped and automatically terminate display of the media control interface 124 responsive to detection that playback has stopped.

At 710, an input is received to the media control interface 124. For instance, the input is a proximity-based input to actuate the seekbar 210, control buttons 212, and/or the touchpad 214. The proximity-based input, for instance, includes one or more of a stylus input, user touch input, interaction with a touchscreen and/or input surface 118 of the mobile device 102, a contactless input based on proximity of a user's finger and/or a stylus to the mobile device 102, and so forth. In one example, the input is to adjust a position of a slider of the seekbar 210. Additionally or alternatively, the input is to actuate one or more of the control buttons 212 and/or the touchpad 214.

At 712, the digital video content 206 is adjusted based on the received input. In an example in which the input is to adjust a position of a slider of the seekbar 210, the mobile device 102 adjusts a temporal location of the digital video content 206 displayed by the remote display device based on the position of the slider. To do so, for instance, the mobile device 102 calculates a ratio of movement of the slider relative to the length of the digital video content 206. The mobile device 102 communicates the ratio to an API of the application 114 and based on the ratio the temporal location of the digital video content 206 is adjusted a corresponding amount.

In an additional or alternative example, the input is to actuate one or more of the control buttons 212. Actuation of the control buttons 212 performs a corresponding action within the application 114 to adjust the digital video content 206. Additionally or alternatively, the input is to actuate a region or regions of the touchpad 214. The mobile device 102 adjusts the digital video content 206 based on the actuation of the touchpad 214, such as to move a digital cursor, perform a scroll operation, and/or leverage additional features of the application 114. Accordingly, the techniques described herein support an enhanced user experience by generating a media control interface 124 particular to the digital video content 206 that is configurable in a variety of ways to enable intuitive control over various applications 114.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 8:
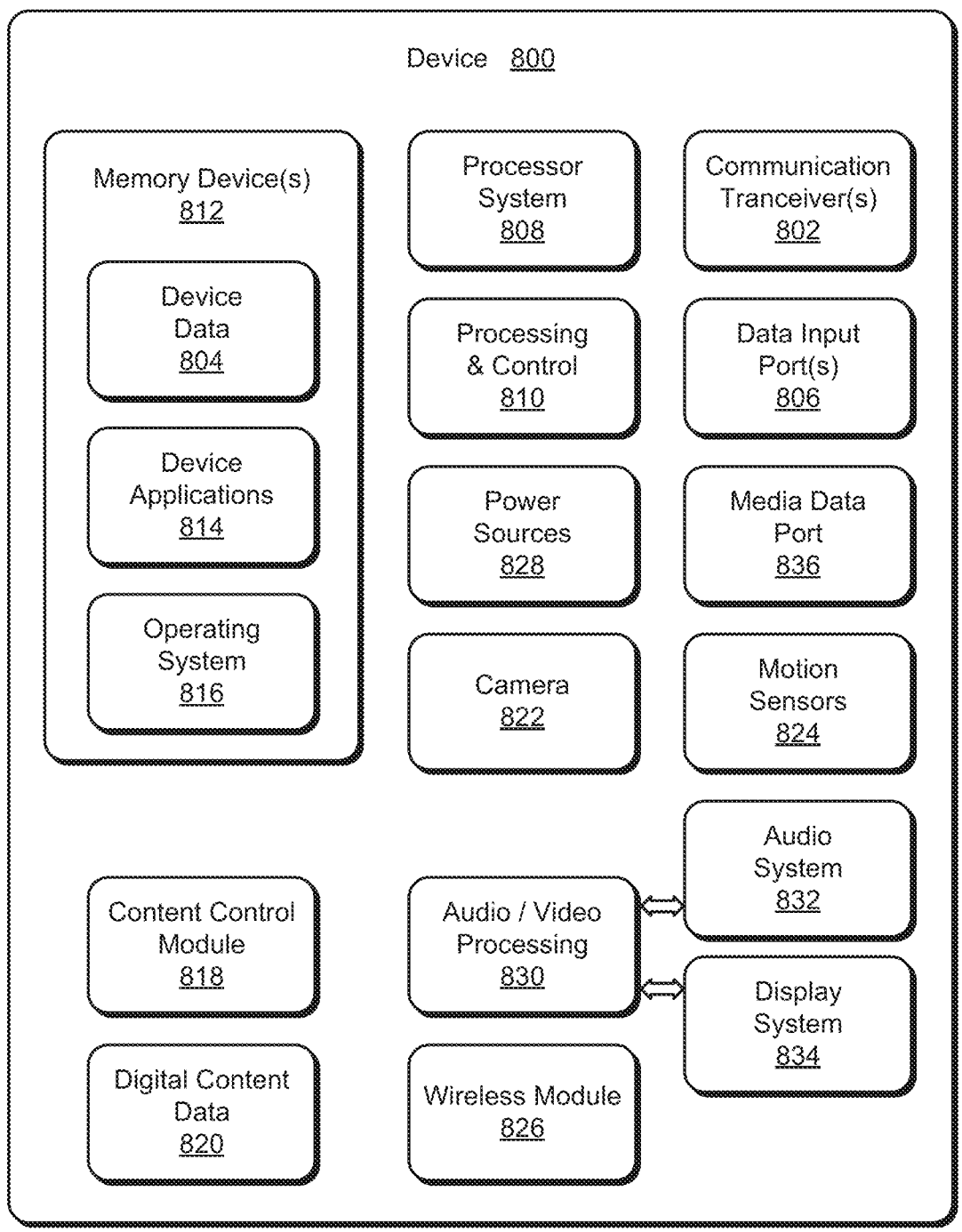
FIG. 8 illustrates various components of an example device in which aspects of media control interface for a mobile device can be implemented.

FIG. 8 illustrates various components of an example device 800 in which aspects of media control interface for a mobile device can be implemented. The example device 800 can be implemented as any of the devices described with reference to the previous FIGS. 1-6, such as any type of mobile device, mobile phone, mobile device, wearable device, tablet, computing, communication, entertainment, gaming, media playback, and/or other type of electronic device. For example, the mobile device 102 as shown and described with reference to FIGS. 1-6 may be implemented as the example device 800.

The device 800 includes communication transceivers 802 that enable wired and/or wireless communication of device data 804 with other devices. The device data 804 can include any of device identifying data, device location data, wireless connectivity data, and wireless protocol data. Additionally, the device data 804 can include any type of audio, video, and/or image data. Example communication transceivers 802 include wireless personal area network (WPAN) radios compliant with various IEEE 702.15 (Bluetooth™) standards, wireless local area network (WLAN) radios compliant with any of the various IEEE 702.11 (Wi-Fi™) standards, wireless wide area network (WWAN) radios for cellular phone communication, wireless metropolitan area network (WMAN) radios compliant with various IEEE 702.16 (WiMAX™) standards, and wired local area network (LAN) Ethernet transceivers for network data communication.

The device 800 may also include one or more data input ports 806 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 800 includes a processing system 808 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 810. The device 800 may further include any type of a system bus or other data and command transfer system that couples the various components within the device. A system bus can include any one or combination of different bus structures and architectures, as well as control and data lines.

The device 800 also includes computer-readable storage memory 812 (e.g., memory devices) that enable data storage, such as data storage devices that can be accessed by a computing device, and that provide persistent storage of data and executable instructions (e.g., software applications, programs, functions, and the like). Examples of the computer-readable storage memory 812 include volatile memory and non-volatile memory, fixed and removable media devices, and any suitable memory device or electronic data storage that maintains data for computing device access. The computer-readable storage memory can include various implementations of random-access memory (RAM), read-only memory (ROM), flash memory, and other types of storage media in various memory device configurations. The device 800 may also include a mass storage media device.

The computer-readable storage memory 812 provides data storage mechanisms to store the device data 804, other types of information and/or data, and various device applications 814 (e.g., software applications). For example, an operating system 816 can be maintained as software instructions with a memory device and executed by the processing system 808. The device applications may also include a device manager, such as any form of a control application, software application, signal-processing and control module, code that is native to a particular device, a hardware abstraction layer for a particular device, and so on. Computer-readable storage memory 812 represents media and/or devices that enable persistent and/or non-transitory storage of information in contrast to mere signal transmission, carrier waves, or signals per se. Computer-readable storage memory 812 do not include signals per se or transitory signals.

In this example, the device 800 includes a content control module 818 that implements aspects of media control interface for a mobile device and may be implemented with hardware components and/or in software as one of the device applications 814. In an example, the content control module 818 can be implemented as the content control module 116 described in detail above. In implementations, the content control module 818 may include independent processing, memory, and logic components as a computing and/or electronic device integrated with the device 800. The device 800 also includes digital content data 820 for implementing aspects of media control interface for a mobile device and may include data from and/or utilized by the content control module 818.

In this example, the example device 800 also includes a camera 822 and motion sensors 824, such as may be implemented in an inertial measurement unit (IMU). The motion sensors 824 can be implemented with various sensors, such as a gyroscope, an accelerometer, and/or other types of motion sensors to sense motion of the device. The various motion sensors 824 may also be implemented as components of an inertial measurement unit in the device.

The device 800 also includes a wireless module 826, which is representative of functionality to perform various wireless communication tasks. For instance, for the mobile device 102, the wireless module 826 can be leveraged to scan for and detect wireless networks, as well as negotiate wireless connectivity to wireless networks for the mobile device 102. The device 800 can also include one or more power sources 828, such as when the device is implemented as a mobile device. The power sources 828 may include a charging and/or power system, and can be implemented as a flexible strip battery, a rechargeable battery, a charged super-capacitor, and/or any other type of active or passive power source.

The device 800 also includes an audio and/or video processing system 830 that generates audio data for an audio system 832 and/or generates display data for a display system 834. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 836. In implementations, the audio system and/or the display system are integrated components of the example device. Alternatively, the audio system and/or the display system are external, peripheral components to the example device.

Although implementations of media control interface for a mobile device have been described in language specific to features and/or methods, the subject of the appended claims is not necessarily limited to the specific features or methods described. Rather, the features and methods are disclosed as example implementations of media control interface for a mobile device, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In some aspects, the techniques described herein relate to a computing device, including: a content control module implemented at least partially in hardware and configured to: generate a seekbar for display by the computing device that corresponds to digital video content of a media application displayed by a remote display device as part of a content connectivity session between the computing device and the remote display device, the seekbar based on a length of the digital video content and a display size of the computing device; generate, automatically and responsive to detecting playback of the digital video content by the media application, a media control interface particular to the digital video content for display by the computing device, the media control interface including the seekbar and one or more digital video control buttons; and display the media control interface by the computing device to control functionality of the media application displayed by the remote display device as part of the content connectivity session.

In some aspects, the techniques described herein relate to a computing device, wherein the content control module is further configured to receive an input to the media control interface to adjust a position of a slider of the seekbar and adjust a temporal location of the digital video content displayed by the remote display device based on the position of the slider.

In some aspects, the techniques described herein relate to a computing device, wherein to adjust the temporal location of the digital video content includes calculating a ratio of movement of the slider relative to the length of the digital video content and communicating the ratio to an application programming interface of the media application.

In some aspects, the techniques described herein relate to a computing device, wherein the one or more digital video control buttons are generated for the media control interface based on data extracted from an application programming interface of the media application.

In some aspects, the techniques described herein relate to a computing device, wherein the media control interface further includes a touchpad that maps actuatable regions of the media application to the touchpad.

In some aspects, the techniques described herein relate to a computing device, wherein to generate the seekbar includes capturing a screenshot of the digital video content displayed by the remote display device to determine the length of the digital video content.

In some aspects, the techniques described herein relate to a computing device, wherein the seekbar includes one or more indicators that denote one or more temporal boundaries included in the digital video content.

In some aspects, the techniques described herein relate to a computing device, wherein the seekbar is generated based on a visual style of the media application.

In some aspects, the techniques described herein relate to a method, including: generating a seekbar for display by a mobile device that corresponds to digital video content of a media application displayed by a remote display device as part of a content connectivity session between the mobile device and the remote display device, the seekbar based on a length of the digital video content and a display size of the mobile device; generating, automatically and responsive to detecting playback of the digital video content by the media application, a media control interface particular to the digital video content for display by the mobile device, the media control interface including the seekbar and a touchpad that maps actuatable regions of the media application to the touchpad; and displaying the media control interface on the mobile device and the digital video content on the remote display device as part of the content connectivity session.

In some aspects, the techniques described herein relate to a method, further including: receiving an input to the media control interface to adjust a position of a slider of the seekbar; and adjusting, responsive to receipt of the input, a temporal location of the digital video content displayed by the remote display device based on the position of the slider.

In some aspects, the techniques described herein relate to a method, wherein adjusting the temporal location of the digital video content includes calculating a ratio of movement of the slider relative to the length of the digital video content and communicating the ratio to an application programming interface of the media application.

In some aspects, the techniques described herein relate to a method, wherein the media control interface includes one or more digital video control buttons that are generated based on data extracted from an application programming interface of the media application.

In some aspects, the techniques described herein relate to a method, wherein the one or more digital video control buttons are dynamically updated during the content connectivity session based on one or more visual properties of the digital video content.

In some aspects, the techniques described herein relate to a method, wherein the seekbar includes one or more indicators that denote one or more temporal boundaries included in the digital video content.

In some aspects, the techniques described herein relate to a method, wherein the seekbar is generated based on a visual style of the media application.

In some aspects, the techniques described herein relate to a method, further including determining, by the mobile device, that playback of the digital video content has stopped; and terminating display of the media control interface responsive to detection that playback has stopped.

In some aspects, the techniques described herein relate to a system, including: one or more processors; and one or more computer-readable storage media storing instructions that are executable by the one or more processors to: generate a seekbar for display by a mobile device that maps to a length of digital video content from a media application displayed by a remote display device as part of a content connectivity session between the mobile device and the remote display device; generate a media control interface particular to the digital video content for display by the mobile device, the media control interface including the seekbar; and display the media control interface by the mobile device and communicate the digital video content for display by the remote display device as part of the content connectivity session.

In some aspects, the techniques described herein relate to a system, wherein the one or more computer-readable storage media storing instructions are further executable to receive an input to the media control interface to adjust a position of a slider of the seekbar; and adjust, responsive to receipt of the input, a temporal location of the digital video content displayed by the remote display device based on the position of the slider.

In some aspects, the techniques described herein relate to a system, wherein to generate the seekbar includes calculating a ratio based on the length of the digital video content, a display size of the remote display device, and a display size of the mobile device.

In some aspects, the techniques described herein relate to a system, wherein the media control interface includes one or more digital video control buttons and a touchpad that maps actuatable regions of the media application to the touchpad.

The invention claimed is:

1. A computing device, comprising:
at least one memory; and
at least one processor coupled to the at least one memory and configured to cause the computing device to:
generate a seekbar for display by the computing device that controls digital video content of a media application displayed by a remote display device as part of a content connectivity session between the computing device and the remote display device, the seekbar based on a length of the digital video content and a display size of the computing device;
generate, automatically and responsive to detecting playback of the digital video content by the media application, a media control interface particular to the digital video content for display by the computing device, the media control interface including the seekbar and one or more digital video control buttons;
detect a visual style of the media application and/or the digital video content and apply one or more visual effects to the seekbar and to the one or more digital video control buttons to match the visual style; and
display the media control interface by the computing device that is separate from the remote display device where the digital video content of the media application is displayed, interaction with the media control interface controlling functionality of the media application displayed by the remote display device as part of the content connectivity session.

2. The computing device as described in claim 1, the computing device further configured to receive an input to the media control interface to adjust a position of a slider of the seekbar and adjust a temporal location of the digital video content displayed by the remote display device based on the position of the slider.

3. The computing device as described in claim 2, wherein to adjust the temporal location of the digital video content includes calculating a ratio of movement of the slider relative to the length of the digital video content and communicating the ratio to an application programming interface of the media application.

4. The computing device as described in claim 1, wherein the one or more digital video control buttons are generated for the media control interface based on data extracted from an application programming interface of the media application.

5. The computing device as described in claim 1, wherein the media control interface further includes a touchpad that maps actuatable regions of the media application to the touchpad.

6. The computing device as described in claim 1, wherein to generate the seekbar includes capturing a screenshot of the digital video content displayed by the remote display device to determine the length of the digital video content.

7. The computing device as described in claim 1, wherein the seekbar includes one or more indicators that denote one or more temporal boundaries included in the digital video content.

8. A method, comprising:
generating a seekbar for display by a mobile device that controls digital video content of a media application displayed by a remote display device as part of a content connectivity session between the mobile device and the remote display device;
generating, automatically and responsive to detecting playback of the digital video content by the media application, a media control interface particular to the digital video content for display by the mobile device, the media control interface including the seekbar and one or more digital video control buttons;
detecting a visual style of the media application and/or the digital video content and applying one or more visual effects to the seekbar and to the one or more digital video control buttons to match the visual style; and
displaying, as part of the content connectivity session, the media control interface on the mobile device that is separate from the remote display device where the digital video content is displayed.

9. The method as described in claim 8, wherein the one or more digital video control buttons are generated based on data extracted from an application programming interface of the media application.

10. The method as described in claim 8, wherein the one or more digital video control buttons are dynamically updated during the content connectivity session based on one or more visual properties of the digital video content.

11. The method as described in claim 8, further comprising:
determining, by the mobile device, that playback of the digital video content has stopped; and
terminating display of the media control interface responsive to detection that playback has stopped.

12. A system, comprising:
one or more processors; and
one or more computer-readable storage media storing instructions that are executable by the one or more processors to:
generate a seekbar for display by a mobile device that maps to a length of digital video content from a media application displayed by a remote display device as part of a content connectivity session between the mobile device and the remote display device;
generate a media control interface for display by the mobile device, the media control interface including the seekbar and one or more digital video control buttons;
detect a visual style of the media application and/or the digital video content and apply one or more visual effects to the seekbar and to the one or more digital video control buttons to match the visual style; and
display, as part of the content connectivity session, the media control interface at the mobile device that is separate from the remote display device where the digital video content is displayed.

13. The system as described in claim 12, wherein to generate the seekbar includes calculating a ratio based on the length of the digital video content, a display size of the remote display device, and a display size of the mobile device.

14. The system as described in claim 12, wherein the media control interface includes a touchpad that maps actuatable regions of the media application to the touchpad.

15. The computing device as described in claim 1, the computing device further configured to detect one or more audial or visual features of the digital video content and generate an additional digital video control button for inclusion in the media control interface based on the one or more audial or visual features.

16. The computing device as described in claim 1, the computing device further configured to detect properties of an upcoming scene within the digital video content displayed by the remote display device and update the media control interface to include an additional digital video control button based on the properties.

17. The computing device as described in claim 15, wherein the additional digital video control button is selectable to enable closed captioning or adjust a volume of audio output by the remote display device.

18. The computing device as described in claim 16, wherein the additional digital video control button is selectable to skip a scene of the digital video content.

19. The computing device as described in claim 1, wherein the digital video content is displayed on the remote display device, and not the computing device.

20. The method of claim 8, wherein the media control interface further includes a touchpad that maps actuatable regions of the media application to the touchpad.

* * * * *